United States Patent
Kondo

(10) Patent No.: US 8,994,980 B2
(45) Date of Patent: Mar. 31, 2015

(54) PRINTING MANAGEMENT APPARATUS, PRINTING SYSTEM, AND PRINTING MANAGEMENT METHOD

(75) Inventor: Atsushi Kondo, Itami (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 587 days.

(21) Appl. No.: 11/781,305

(22) Filed: Jul. 23, 2007

(65) Prior Publication Data

US 2008/0204790 A1    Aug. 28, 2008

(30) Foreign Application Priority Data

Feb. 27, 2007   (JP) .................................. 2007-047252

(51) Int. Cl.
*G06F 3/12* (2006.01)
*H04N 1/60* (2006.01)

(52) U.S. Cl.
CPC ............ *G06F 3/1226* (2013.01); *G06F 3/1213* (2013.01); *G06F 3/1222* (2013.01); *G06F 3/1239* (2013.01); *G06F 3/1273* (2013.01); *G06F 3/1288* (2013.01)
USPC ......... 358/1.15; 358/1.13; 358/1.9; 358/1.11; 358/401; 358/296; 399/79

(58) Field of Classification Search
USPC ............... 358/1.15, 1.13, 1.1–1.9, 1.11–1.18, 358/401, 403, 296
See application file for complete search history.

(56) References Cited

U.S. PATENT DOCUMENTS

| | | | | |
|---|---|---|---|---|
| 6,519,053 | B1* | 2/2003 | Motamed et al. | 358/1.16 |
| 6,822,754 | B1* | 11/2004 | Shiohara | 358/1.15 |
| 7,505,633 | B2 | 3/2009 | Kitajima | |
| 2004/0046989 | A1* | 3/2004 | Matsugi | 358/1.15 |
| 2005/0250631 | A1* | 11/2005 | Su-Tuan | 482/148 |
| 2005/0275868 | A1* | 12/2005 | Higashiura et al. | 358/1.14 |
| 2006/0221388 | A1* | 10/2006 | Yoshikawa et al. | 358/1.15 |
| 2006/0250631 | A1* | 11/2006 | Igarashi | 358/1.13 |
| 2006/0262335 | A1* | 11/2006 | Varga | 358/1.13 |
| 2007/0046989 | A1* | 3/2007 | Shima | 358/1.15 |

FOREIGN PATENT DOCUMENTS

| | | |
|---|---|---|
| JP | 09-034660 | 2/1997 |
| JP | 11-095937 A | 4/1999 |
| JP | 2000-071577 A | 3/2000 |

(Continued)

OTHER PUBLICATIONS

Japanese Office Action issued in corresponding Japanese Patent Application No. 2007-047252, dated Jan. 6, 2009, and translation thereof.

*Primary Examiner* — Quang N Vo
(74) *Attorney, Agent, or Firm* — Buchanan Ingersoll & Rooney PC

(57) ABSTRACT

A management apparatus receives an allocation request from a printer in accordance with a designation of a user, and reads a page count upper limit and an already-allocated page count for the user. The management apparatus calculates an allocable page count by subtracting an already-allocated page count from the page count upper limit, and if the allocable page count is greater than 0, calculates a page count allocation that is based on the printing speed of the printer and is lower the lower the allocable page count is. The printing management apparatus prints the obtained allocable page count to the printer.

45 Claims, 6 Drawing Sheets

(56) References Cited

FOREIGN PATENT DOCUMENTS

| JP | 2000-151873 | 5/2000 |
|----|-------------|--------|
| JP | 2001-117737 | 4/2001 |
| JP | 2003-030405 | 1/2003 |
| JP | 2005-032004 | 2/2005 |
| JP | 2005-275727 A | 10/2005 |
| JP | 2006-251904 | 9/2006 |
| JP | 2007-030190 | 2/2007 |

* cited by examiner the printer's intention to use. By counting the remaining page count and subtracting the value obtained from the sum of Si×R/(Si+...+SN).

PRINTING MANAGEMENT APPARATUS, PRINTING SYSTEM, AND PRINTING MANAGEMENT METHOD

CROSS-REFERENCE TO RELATED APPLICATIONS

This application is based on application No. 2007-47252 filed in Japan, the content of which is hereby incorporated by reference.

BACKGROUND OF THE INVENTION (1) Field of the Invention

The present invention relates to a printing management apparatus, a printing system and a printing management method for managing how many pages a user of a printer prints, and in particular to a technique for efficient printing by a plurality of printers.

(2) Description of the Related Art

Conventionally, when using printing apparatuses such as copiers and printers (hereinafter, "printer(s)" is used to mean any such printing apparatus) in an office or the like, it is common to manage operations by, for instance, setting a limit to the number of pages each individual department or user may print in accordance with a budget.

Japanese patent application publication No. 2005-275727 discloses the following technique. An upper limit of the number of pages that may be printed is managed by a management server. The management server issues an electronic ticket to a printer showing how many pages the user has already printed and a usage page count upper limit, so that the number of pages that the user prints does not exceed the usage page count upper limit. By issuing divisional tickets with respect to and individual user ID, print instructions can be issued to a plurality of printers.

However, with the divisional tickets, the usage page count upper limit is divided evenly in advance into n portions (n being a constant or the number of printers managed by the management server, for instance), and one portion is written in each of the divisional tickets as a provisional usage page count upper limit. Since this provisional usage page count upper limit does not take into account factors such as the performance of the printers with which the divisional tickets are to be used, the same provisional usage page count upper limit is allocated to each printer regardless of whether the printer is capable of printing 10 pages per minute or 100 pages per minute. For this reason, problems arise such as the provisional usage page count upper limit written in the divisional tickets being an obstacle if printing is to be instructed in a manner that sufficiently utilizes the performance of each printer. Furthermore, when the usage page count upper limit runs low, the provisional usage page count upper limit is also likely to be low. Therefore, a problem may arise that the user is unable to print because the provisional page count upper limit is insufficient for the number of pages that the user needs to print.

SUMMARY OF THE INVENTION

The present invention was conceived in view of the described problems, and has an object of providing a printing management apparatus, a printing system and a printing management method that enable a page count allocation to be made based on performance of a printer.

The present invention also has an object of providing a printing management apparatus, a printing system, and a printing management method capable of making a page count allocation smoothly so as to reduce the likelihood of printing processing being unable to be executed due to a usage page count upper limit having run low.

In order to achieve the described objects, one aspect of the present invention is a printing management apparatus that manages how many pages are printed by a user, including: a page count storage part operable to store an allocable page count that is a total number of pages available to a user for printing; an allocating part operable to allocate a page count allocation that is how many pages the user is actually permitted to print, in accordance with a request from a printer; and a transmitter operable to transmit the page count allocation to the printer, wherein the page count allocation is equal to or less than the allocable page count, and is determined in accordance with performance of the printer.

By distributing the page count allocation to the printer based on the performance of the printer, it is unlikely that a situation in which printing processing will be unable to be executed will arise even if a total printed page count nears a predetermined page count upper limit.

Here, the performance of the printer may be at least one of (a) a printing speed of the printer, (b) which of monochrome and color the printer prints in, and (c) whether or not the printer is provided with optional equipment.

Note that in the present specification, "page count" is not limited to meaning the number of recording sheets printed by a printer, but should be interpreted broadly as a term referring to usage of a printer by a user. For instance, in the case of the printer performing double-sided printing, the remaining page count may be calculated by subtracting two pages from the page count allocation even if the recording sheet that is printed on is one page.

Furthermore, the page count allocation that the allocating part allocates may be lower, the lower the printing speed of the printer. With this structure, the time required to print the number of pages shown by the page count allocation can be made to be uniform between printers, rather than being different depending on the printing speed of the printers. This avoids the problem of the allocable page count running out due to a large number of pages being allocated disproportionately to a single printer.

In such a case, it is preferable that the printer is any one of N printers used by the user, and when the printing speed of each of the N printers is Si pages/minute (i=1, ..., N) and the allocable page count is R pages, the page count allocation of any one of the printers having a printing speed Si may be Si×R/(Si+...+SN).

Furthermore, when the allocable page count is less than a predetermined page count lower limit, the allocating part may set the page count allocation to a fixed number of pages. The lower the number of pages of the page count allocation is, the higher overheads for communication and the like are because allocation requests are made more frequently. This delays the printing processing. By providing a lower limit for the page count allocation and not allowing the page count allocation to fall below the lower limit, the problem of delays is resolved.

Furthermore, when the allocable page count is greater than a predetermined upper limit that is greater than a predetermined page count lower limit, the allocating part may set the page count allocation to a fixed number of pages. This resolves the problem of unfair page allocation between printers due to the page count allocation being excessive.

Furthermore, the printing management apparatus may further include: a receiver operable to receive notification of a remaining page count from the printer, the remaining page count being a page count that is the page count allocation excluding a printed page count; and an allocable page count updating part operable to, when the allocation part allocates the page count allocation, reduce the allocable page count by a number of pages equal to the page count allocation, and when the receiver receives the remaining page count, increase the allocable page count by a number of pages equal to the remaining page count.

By lowering the page count allocation per printer the lower the allocable page count is, the problem of the allocable page count running out due to a fixed page count allocation can be reduced. Therefore, it is unlikely that printing processing will be unable to be executed even if a total printed page count nears a predetermined page count upper limit.

Furthermore, another aspect of the present invention is a printing system comprising a plurality of printers and a printing management apparatus that manages how many pages are printed by a user of the printers, the printing management apparatus including: a printing speed storage part operable to store a printing speed of each of the plurality of printers; a page count storage part operable to store an allocable page count that is a total number of pages available to a user for printing; an allocating part operable to allocate a page count allocation that is how many pages the user is actually permitted to print, in accordance with a request from any of the printers; and a transmitter operable to transmit the page count allocation to the printer that made the request, and each of the printers including: a request part operable to make a request for a page count allocation to the printing management apparatus, in accordance with a print instruction from the user, wherein the page count allocation is equal to or less than the allocable page count, and is determined in accordance with performance of said printer. With this structure, even if the allocable page count becomes low, it is unlikely that the problem of a print job being unable to be executed depending on timing will occur.

Furthermore, another aspect of the present invention is a printing management method for managing how many pages are printed by a user, including: a page count storage step of storing an allocable page count that is a total number of pages available to a user for printing; an allocating step of allocating a page count allocation that is how many pages the user is actually permitted to print, the page count allocation being allocated so as to be no greater than the allocable page count and to be based on performance of a printer, in accordance with a request from the printer; and a transmission step of transmitting the page count allocation to the printer.

According to the printing management apparatus, printing system, and printing management method of the present invention, a page count allocation can be made based on performance of a printer. Furthermore, the present invention is capable of making a page count allocation smoothly such that it is unlikely that a situation in which printing processing will be unable to be executed will arise even if a usage page count upper limit has become relatively low.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

Figure 1:
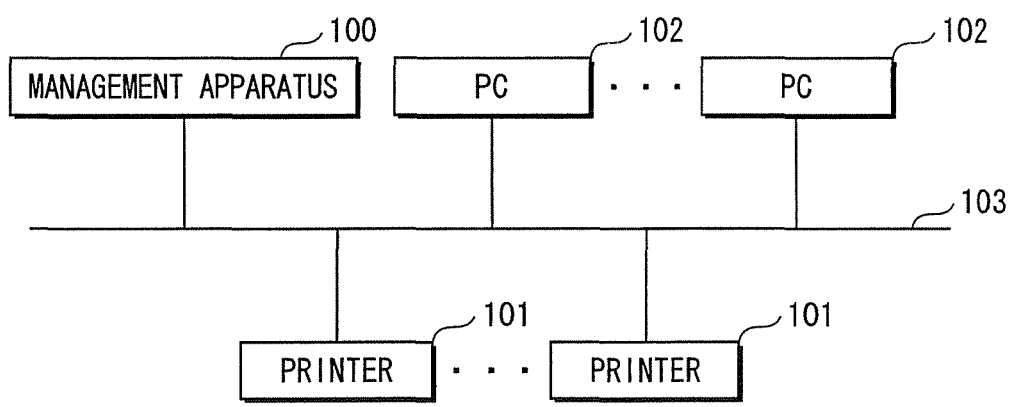
FIG. 1 shows the structure of a network printing system 1 of an embodiment of the present invention.

Referring to the drawings, the following describes an embodiment of a print management apparatus of the present invention using an example of a network printing system.

1) Structure of the Network Printing System

First, a description is given of the structure of a network printing system 1 relating to an embodiment of the present invention. FIG. 1 shows the structure of the network printing system 1 of the present embodiment. As shown in FIG. 1, the network printing system 1 is composed of a management apparatus 100, printers 101, and PCs (personal computers) 102 connected via a network 103. Note that hereinafter reference is made to a single printer 101 and a single PC 102 that are representative of the printers 101 and PCs 102.

The management apparatus 100 monitors the number of pages printed by each user of the network printing system 1, to control the printers 101 such that a pre-assigned page count upper limit is not exceeded. The printer 101 receives an execution instruction for a print job from a user, and executes the print job. The user can create print data such as a written document or an image using the PC 102.

2) Operations of the Network Printing System 1

A description is now given of the operations of the network printing system 1 that particularly relate to management of the upper limit of the number of printed pages.

Figure 2:
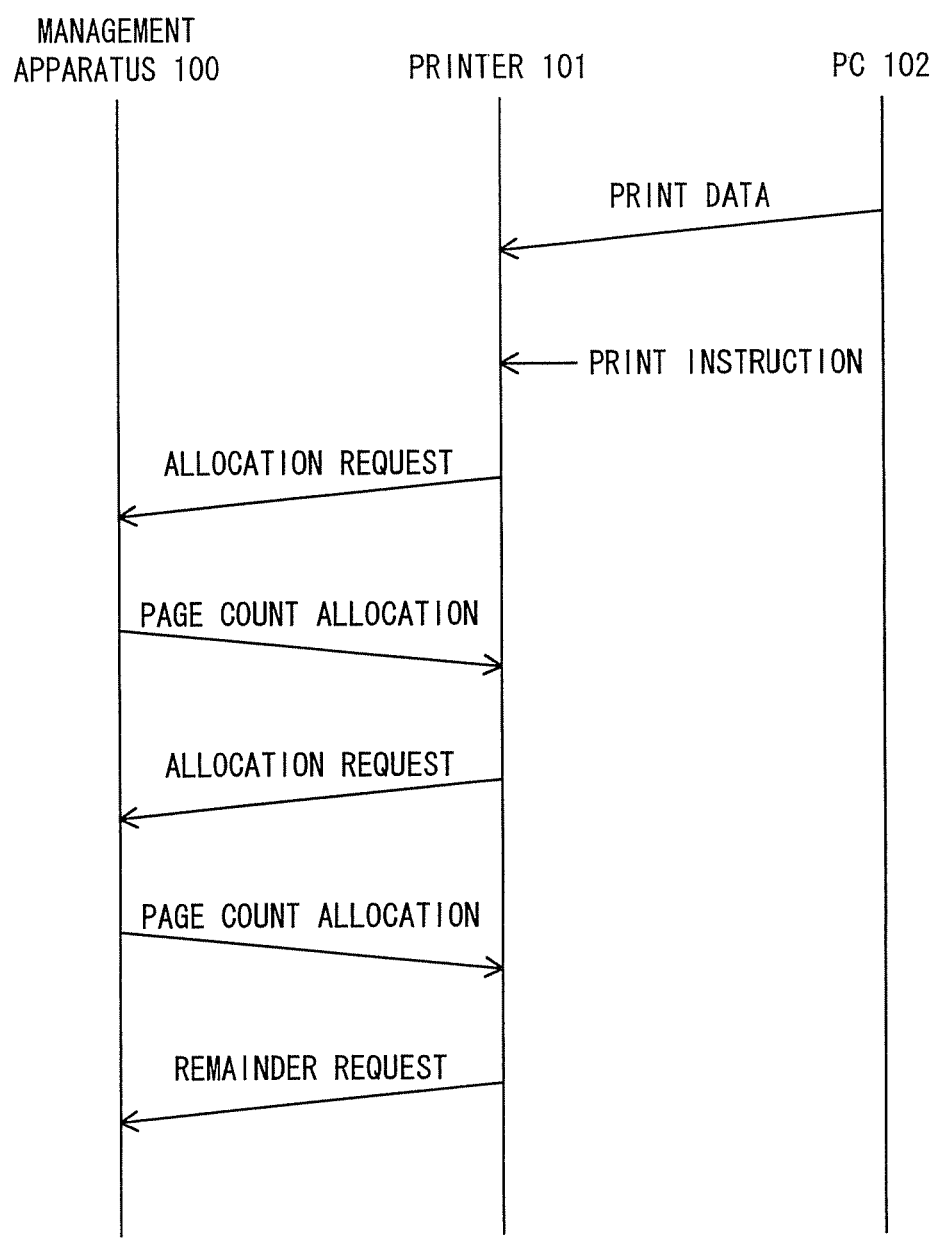
FIG. 2 is a communication sequence showing an example of operations of the network printing system 1 of an embodiment of the present invention.

FIG. 2 is a communication sequence showing an example of operations of the network printing system 1. As shown in FIG. 2, the PC 102 first transmits print data to the printer 101. The print data is document data, image data, or the like created by the user using an application program installed in the PC 102.

The printer 101 then receives a print instruction for the print data from the user. In this case, the printer 101 receives the print instruction accompanying a designation of print data after the user has logged in. Having received the print instruction, the printer 101 transmits an allocation request to the management apparatus 100. The allocation request is a request for a page count allocation following a designation of the user.

The management apparatus 100 stores therein the page count upper limit set in advance for the user, and the number of pages that have already allocated to the user (hereinafter referred to as an already-allocated page count). Upon receiving the page count allocation request from the printer 101, the management apparatus 100 subtracts the already-allocated page count from the page count upper limit to find how many pages are available to the user (hereinafter referred to as an allocable page count).

Next, the management apparatus 100 transmits a page count allocation in accordance with the allocable page count to the printer 101. The printer 101 receives the page count allocation, and executes the print job within the scope of the page count allocation.

If the print job is unable to be completed by printing the number of pages shown by the page count allocation, the printer 101 newly transmits a page count allocation request to the management apparatus 100, and receives a new page count allocation. When the printing is complete, the printer 101 then notifies the management apparatus 100 of a designation of the user, and a remaining page count that is how many pages remain after subtracting the printed page count from the received page count allocation.

3. Structure of the Management Apparatus 100

Next a description is given of the structure of the management apparatus 100.

Figure 3:
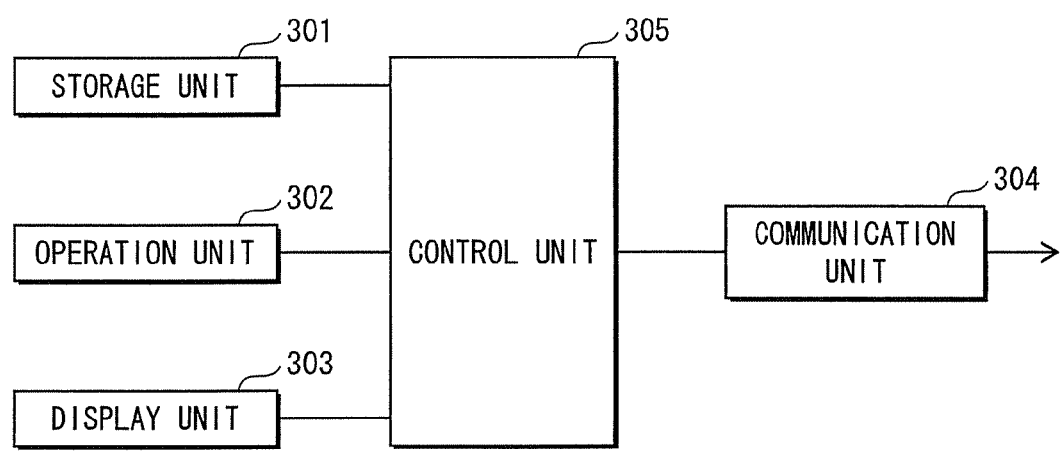
FIG. 3 is a block diagram showing the hardware structure of a management apparatus 100 of an embodiment of the present invention.

FIG. 3 is a block diagram showing the hardware structure of the management apparatus 100. As shown in FIG. 3, the management apparatus 100 is composed of a storage unit 301, an operation unit 302, a display unit 303, a communication unit 304, and a control unit 305. The storage unit 301 stores a print management program and print management data, and the control unit 305 executes the print management program using the print management data.

Figure 4:
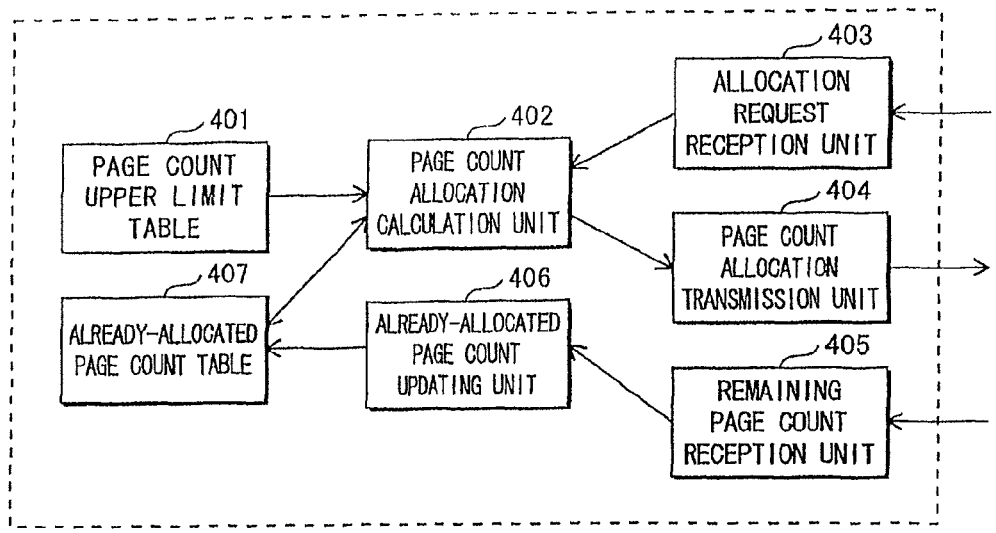
FIG. 4 is a block diagram showing the main functional structure of the management apparatus 100 of an embodiment of the present invention.

FIG. 4 is a block diagram showing the main functional structure of the management apparatus 100. As shown in FIG. 4, the management apparatus 100 is composed of a page count upper limit table 401, a page count allocation calculation unit 402, an allocation request reception unit 403, a page count allocation transmission unit 404, a remaining page count reception unit 405, an already-allocated page count updating unit 406, and an already-allocated page count table 407.

The page count upper limit table 401 is a table in which is recorded in advance an upper limit for each user showing how many pages the user can print, (hereinafter referred to as a page count upper limit). The already-allocated page count table 407 is a table in which is recorded how many pages have already been allocated to the printers 101 for each user (hereinafter referred to as an already-allocated page count).

The allocation request reception unit 403 receives an allocation request for a page count allocation in accordance with a designation of the user, from the printer 101.

In response to the allocation request from the printer 101, the page count allocation unit 402 reads the page count upper limit set for the user from the page count upper limit table 401, and an already-allocated page count for the user from the already-allocated page count table 407. Next, the page count allocation unit 402 calculates a page count allocation in accordance with an allocable page count obtained by subtracting the already-allocated page count from the page count upper limit.

The page count allocation transmission unit 404 transmits the page count allocation to the printer 101 that requested the page count allocation. The remaining page count reception unit 405 receives, from the printer 101, a designation of the user and a remaining page count obtained by subtracting the actual number of pages printed from the page count allocation.

The already-allocated page count updating unit 406 reads, from the already-allocated page count table 407, the already-allocated page count of the user relating to the remaining page count received by the remaining page count reception unit 405, subtracts remaining page count from the read already-allocated page count to calculate a new already-allocated page count, and records the new already-allocated page count in the already-allocated page count table 407.

4. Structure of the Printer 101

Next a description is given of the structure of the printer 101.

Figure 5:
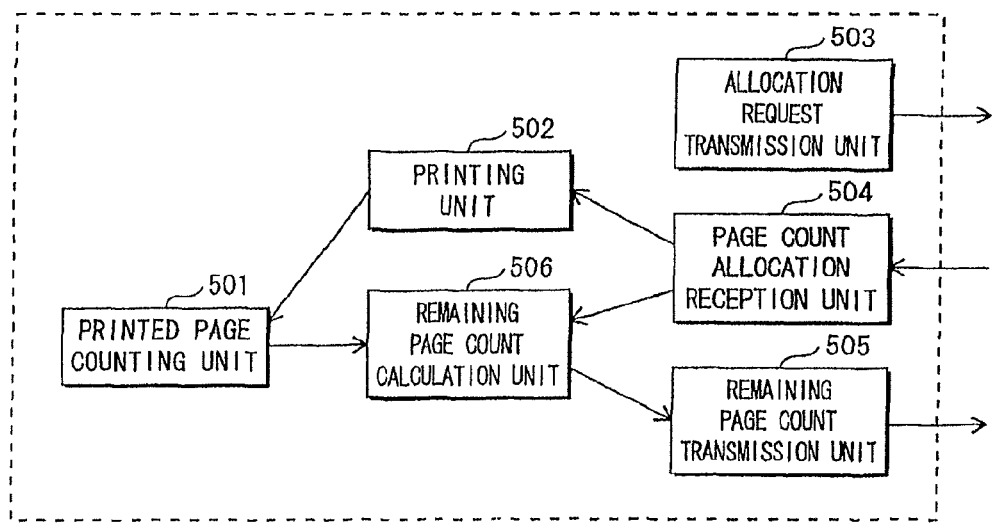
FIG. 5 is a block diagram showing the main functional structure of a printer 101 of an embodiment of the present invention.

FIG. 5 is a block diagram showing the main functional structure of the printer 101. As shown in FIG. 5, the printer 101 is composed of a printed page counting unit 501, a printing unit 502, an allocation request transmission unit 503, a page count allocation reception unit 504, a remaining page count transmission unit 505, and a remaining page count calculation unit 506.

The allocation request transmission unit 503 transmits a request for a page count allocation, together with a designation of the user, to the management apparatus 100. The page count allocation reception unit 504 receives a page count allocation from the management apparatus 100. The printing unit 502 executes printing within a scope that does not exceed the page count allocation.

The printed page counting unit 501 counts the number of pages printed by the printing unit 502. The remaining page count calculation unit 506 calculates a remaining page count by subtracting the printed page count counted by the printed page counting unit 501 from the page count allocation. The remaining page count transmission unit 505 transmits the calculated remaining page count calculated by the remaining page count calculation unit 506 to the management apparatus 100.

5. Operations of the Management Apparatus 100

Next a description is given of operations of the management apparatus 100.

Figure 6:
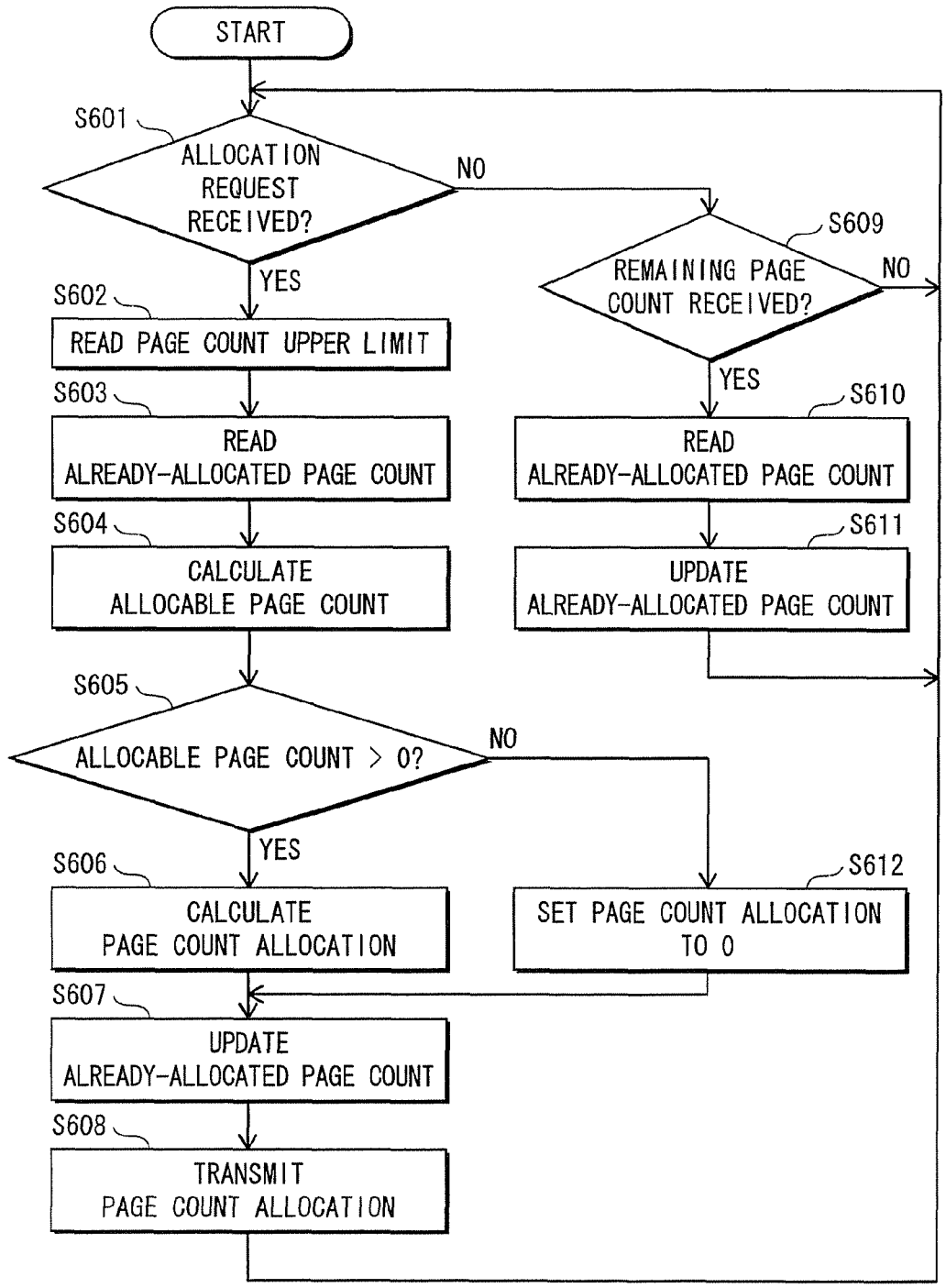
FIG. 6 is a flowchart showing main operations of the management apparatus 100 of an embodiment of the present invention.

FIG. 6 is a flowchart showing the main operations of the management apparatus 100. As shown in FIG. 6, when the allocation request reception unit 403 of the management apparatus 100 receives an allocation request from the printer 101 in accordance with a designation of a user (S601: YES), the management apparatus 100 reads the page count upper limit of the user from the page count upper limit table 401 (S602), and reads the already-allocated page count of the user from the already-allocated page count table 407 (S603).

The page count allocation calculation unit 402 subtracts the already-allocated page count from the page count upper limit, to calculate an allocable page count (S604). If the allocable page count is greater than 0 (S605: YES), the management apparatus 100 calculates a page count allocation corresponding to the performance of the printer 101 (S606). Note that the method used to calculate the page count allocation is described below. When the allocable page count is 0 or lower (S605: NO), the page count allocation is set as 0 (S612).

Next, the management apparatus 100 adds the page count allocation to the already-allocated page count, to obtain a new already-allocated page count, and records the new already-allocated page count in the already-allocated page count table 407 (S607). The page count allocation transmission unit 404 transmits the page count allocation to the printer 101 (S608), and the operations return to step S601.

When the management apparatus 100 does not receive an allocation request (S601: NO), and the remaining page count reception unit 405 receives a remaining page count from the printer 101 in accordance with a designation of a user (S609: YES), the already-allocated page count updating unit 406 reads the already-allocated page count for the user from the already-allocated page count table 407 (S610). The already-allocated page count updating unit 406 subtracts the remaining page count from the read already-allocated page count page count to obtain a new already-allocated page count, and records the new already-allocated page count in the already-allocated page count table 407 (S611).

6. Operations of the Printer 101

Next a description is given of operations of the printer 101.

Figure 7:
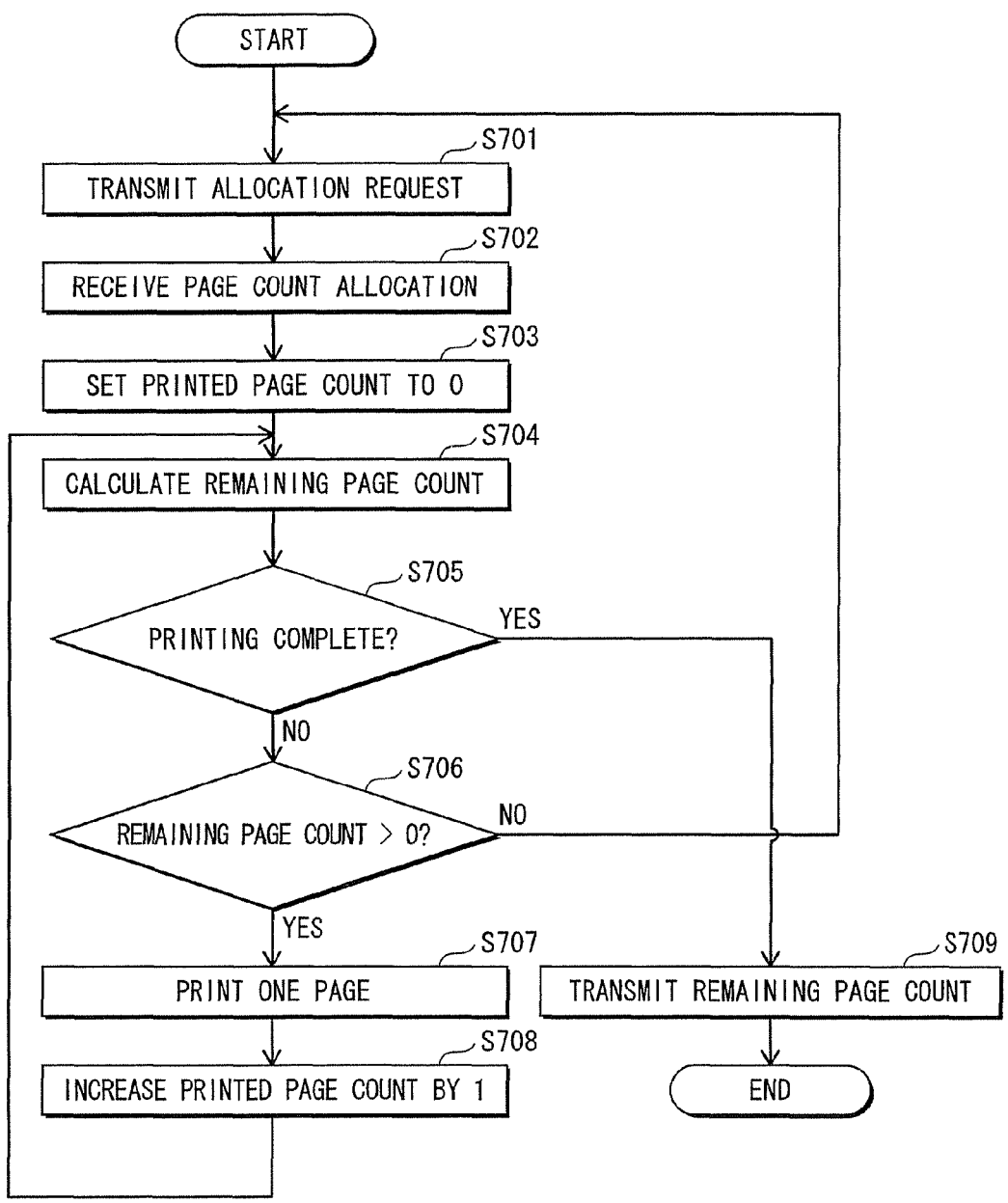
FIG. 7 is a flowchart showing main operations of the printer 101 of an embodiment of the present invention.

FIG. 7 is a flowchart showing the main operations of the printer 101. As shown in FIG. 7, when the printer 101 receives an execution instruction for a print job from the user, the allocation request transmission unit 503 transmits an allocation request in accordance with a designation of the user to the management apparatus 100 (S701).

The allocation page count reception unit 504 of the management apparatus 100 receives a page count allocation from the management apparatus 100 (S702), and the printed page counting unit 501 initializes a printed page count that is a variable held therein to 0 (S703).

Next, the remaining page count calculation unit 506 calculates a remaining page count by subtracting the printed page count from the page count allocation (S704). If the print job is not complete (S705: NO), and if the remaining page count is 1 or greater (S706: YES), the print unit 502 prints one page (S707). The printed page counting unit 501 increases the printed page count by 1 (S708), and the processing moves proceeds to step S704.

If the remaining page count is 0 or lower (S706: NO), the printer 101 sends a new allocation request to the management apparatus 100 (S701), and repeats the described processing. Furthermore, if the print job is complete (S705: YES), the remaining page count transmission unit 505 transmits the remaining page count to the management apparatus 100 (S709), and the processing ends.

7. Calculation of the Page Count Allocation

Next, a description is given of the method used by the page count allocation calculation unit 402 of the management apparatus 100 to calculate the page count allocation.

First a description is given of when the page count allocation is set as a fixed amount. In this case, the page count allocation can be set as a certain multiple of the printing speed of the printer that has made an allocation request. The printing speed may be stored in the storage unit 11, or may be transmitted by the printer at the same time as the allocation request. For instance, if the page count allocation is to be set as the number of pages that the printer can print in three minutes, if the printing speed is 100 pages per minute, the page count allocation will be 10 pages/minute×3 minutes=300 pages.

When the allocable page count falls to a predetermined page count or lower and is close to running out, a problem will occur that if a fixed page count is allocated in response to each allocation request, pages will be allocated wastefully, meaning that subsequent allocation will not be able to be performed. Therefore, a possible method is one in which the page count allocation is set to a fixed page count only when the allocable page count is no less than a predetermined page count.

When the printer is a high-performance printer, it is highly likely that the user will instruct printing of a large number of pages. Therefore, if the value of the page count allocation is set in accordance with the printing speed rather than being set as a fixed page count, a large number of pages can be allocated to a high-performance printer having a fast printing speed. This enables page count allocation to be made in accordance with the needs of the user.

Next, a description is given of the method used to calculate the page count allocation when the page count allocation is variable rather than fixed.

If the number of printers in the network printing system 1 is N, the page count allocation Pi allocated to the i-th printer 101 is calculated $$Pi = Si \times \alpha.$$

Here, Si is the printing speed (pages per minute) of the i-th printer 101. Furthermore, $\alpha$ has a value determined in accordance with the allocable page count R.

$$\alpha = R\text{min}/S \ldots R < R\text{min}$$
$$R/S \ldots R\text{min} \leq R < R\text{max}$$
$$R\text{max}/S \ldots R\text{max} \leq R$$

where $S = S1 + \ldots + SN$.

In other words, S is the total printing speed of all printers 101 in the network printing system 1.

Rmin is set as a number of pages that allows printing to be performed for an approximate amount of time that is sufficient for an average job to not be interrupted. For instance, if an approximate time that is sufficient for an average job not to be interrupted is 30 seconds (=0.5 minutes), $$R\text{min} = S \times 0.5.$$

Furthermore, Rmax is the maximum value of the page count allocation given to the printer 101. When a problem such as a fault in the printer 101 or a network failure between the printer 101 and the management apparatus 100 occurs that prevents the printer 101 from sending notification of the remaining page count for a relatively long period of time, the page count allocation remains as a greatest page count allocation.

It is particularly problematic if the greatest page count allocation is given to the printer 101 when the printer 101 is a printer having a slow printing speed. Rmax is provided in this way in order to avoid an unfair situation in which the already-allocated page count is excessively large, and the number of pages that can be allocated to other printers 101 is relatively low.

Therefore, it is suitable to set Rmax to S×5 which is the maximum page count that the network printing system 1 is capable of printing in 5 minutes, for instance. This means that the page count allocation Pi can be kept relatively low even if the allocable page count R is sufficiently large.

With such a setting, when the allocable page count R is less than Rmax, the page count allocation is reduced in accordance with the allocable page count R, and is allocated fairly in accordance with the printing speed of each printer 101. This resolves the problem of printing being unable to be executed due to a page count allocation being unable to be made.

This also prevents delays in printing processing that may occur when frequent allocation requests are made due to the allocable page count R being a fixed number rather than being reduced when the allocable page count R drops below Rmin.

The following shows examples of specific page counts. If the page count upper limit is 10,000 pages, the print speed of each of eleven printers 101 is 100 pages/minute . . . 1 printer,
50 pages/minute . . . 2 printers,
30 pages/minute . . . 4 printers,
20 pages/minute . . . 4 printers.

Therefore, the total print speed is $$S = 100 \times 1 + 50 \times 2 + 30 \times 4 + 20 \times 4 = 400.$$

Furthermore, Rmax and Rmin are 2,000 pages and 200 pages, respectively. In other words, the maximum numbers of pages that the network printing system 1 can print in 5 minutes and in 30 seconds.

In such a case, based on the above expression, the page count allocation allocated to the printer 101 having the printing speed of 100 pages per minute will be 500 pages when the allocable page count R is 5,000 pages, 375 pages when the allocable page count R is 1,500 pages, 250 pages when the allocable page count R is 1,000 pages, and 50 pages when the allocable page count R is 150 pages.

Note that since the allocable page count changes in accordance with the printed page count, the page count allocation also changes.

8. Modifications

The present invention has been described based on, but is not limited to, a preferred embodiment. However, modifications such as the following may be implemented.

(1) Although the page count allocation is calculated in accordance with the printing speed in the preferred embodiment, the present invention is not limited to such a structure, the following being an alternative.

Specifically, the printer performance used as a basis to determine the page count allocation may be a printing type, in other words, whether the printer is a monochrome printer or a color printer. For instance, if the user belongs to a department where the number of pages that can be printed in color is restricted, the fixed amount of the page count allocation for a color printer can be set lower than for a monochrome printer. Furthermore, it is assumed that if the printer has a finisher (i.e., optional equipment that realizes optional functions such as staples or a hole punch), the printer is for printing large amounts of materials, and therefore the fixed amount of the page count allocation for such a printer may be set greater than the fixed amount for a printer that does not have a finisher.

(2) Although the preferred embodiment describes a case of the printer 101 transmitting an allocation request upon receiving an execution instruction for a print job, the present invention is not limited to such a structure, the following being an alternative.

Specifically, the printer 101 may be logged into by a user, and transmit an allocation request to the management apparatus 100 when the user logs in. With this structure, since a page count allocation has already been allocated when the user instructs execution of the print job, the time taken until the execution of the of the print job is complete (the waiting time for the user) is decreased.

(3) Although not mentioned in the preferred embodiment, if the printer 101 has received a page count allocation but the received page count allocation is insufficient, the printer may transmit another allocation request to the management apparatus 100 when a predetermined number of pages from among the page count allocation have been printed.

In this case, the predetermined number of pages may be a fixed page count, or may be varied in accordance with the already-allocated page count stored in the already-allocated page count table 407 in the management apparatus 100. More specifically, the allocation request may be transmitted at an early stage while the already-allocated page count is relatively low, and transmitted at a comparatively late stage when the page count allocation increases. Whether the already-allocated page count is low or high may be judged based on whether or not the allocable page count R is below Rmax.

(4) Although the preferred embodiment describes a case of the expression $$Pi = Si \times \alpha$$

being used to calculate the page count allocation, the present invention is not limited to using this expression. The same effect can be achieved by reducing the page count allocation as the allocable page count R decreases.

(5) Although the preferred embodiment describes a case of the page count allocation being allocated in proportion with the printing speed of each printer 101, the present invention is not limited to this structure. The same effect can be achieved by instead reducing the page count allocation as the allocable page count decreases, regardless of the printing speed of each of the printers 101.

Note that in the present modification example and the modification example (3), it is possible to not reduce the page count allocation any further when the allocable page count R reaches a predetermined value Rmin. This suppresses increases in overheads caused by frequent allocation requests.

(6) Although not mentioned in the preferred embodiment, in the present specification it not necessary for the number of printed pages to match the number of recording sheets that were required for printing. For instance, if the printer executes double-sided printing, the printed page count may be made to be 2 even if the actual number of pages of recording paper is 1. Generally, the usage state of a printer is monitored not only in terms of the number of pages of recording paper, but also in terms of the amount of toner consumed. Therefore, it is preferable that the printer counts the number of printed pages in accordance with the usage condition.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A printing management apparatus that manages how many pages are permitted to print for each printer in a printing network having a plurality of printers, as a page count allocation, comprising:
   a transmitter operable to transmit the page count allocation to the plurality of printers, and
   a processor configured to:
   store an allocable page count that is a total number of pages available to a user for printing, corresponding to a difference between an already-allocated page count and a page count upper limit for the user;
   receive a page count allocation request from a printer in the printing network;
   determine the page count allocation for the user based on the allocable page count and a relative performance of the printer, from which the page count allocation request has been received, among performances of all printers in the printing network, wherein the page count allocation is equal to or less than the allocable page count; and
   transmit the page count allocation to the printer from which the page count allocation request has been received.

2. The printing management apparatus of claim 1, wherein the performance of the printer is at least one of (a) a printing speed of the printer, (b) which of monochrome and color the printer prints in, and (c) whether or not the printer is provided with optional equipment.

3. The printing management apparatus of claim 2, wherein the lower the printing speed of the printer, the lower the allocated page count allocation.

4. The printing management apparatus of claim 2, wherein the printer is any one of N printers used by the user, and when the printing speed of each of the N printers is Si pages/minute (i=1, . . . , N) and the allocable page count is R pages, the page count allocation of any one of the printers having a printing speed Si is Si×R/(Si+ . . . +SN).

5. The printing management apparatus of claim 2, wherein when the allocable page count is less than a predetermined page count lower limit, the page count allocation is set to a fixed number of pages.

6. The printing management apparatus of claim 2, wherein when the allocable page count is greater than a predetermined upper limit that is greater than a predetermined page count lower limit, the page count allocation is set to a fixed number of pages.

7. The printing management apparatus of claim 2, further comprising:
a receiver operable to receive notification of a remaining page count from the printer, the remaining page count being a page count that is the page count allocation excluding a printed page count; and
wherein the processor is further configured to, when the page count allocation is allocated, reduce the allocable page count by a number of pages equal to the page count allocation, and when the receiver receives the remaining page count, increase the allocable page count by a number of pages equal to the remaining page count.

8. The printing management apparatus of claim 1, wherein the page count allocation is determined independent of a number of pages of print data at the printer.

9. The printing management apparatus of claim 1, wherein the printer transmits a second page count allocation request to the management apparatus, and receives a second page count allocation.

10. The printing management apparatus of claim 1, wherein
the page count allocation is set to a fixed number of pages that is determined in advance when the allocable page count is equal to or greater than a predetermined number of pages, and the page count allocation is set to a number of pages that is equal to or less than the allocable page count and that is in accordance with the performance of the printer when the allocable page count is less than the predetermined number of pages.

11. The printing management apparatus of claim 1, wherein the processor stores information for the plurality of printers in the printing network.

12. The printing management apparatus of claim 1, wherein the processor is further configured to:
receive a remaining page count corresponding to a difference between a printed page count and the page count allocation; and
update the allocable page count by adding the remaining page count.

13. A printing system comprising a plurality of printers and a printing management apparatus that manages how many pages are permitted to print for each printer of the plurality of printers, as a page count allocation,
the printing management apparatus including:
a transmitter operable to transmit the page count allocation to the plurality of printers, and
a processor configured to:
store a printing speed of each of the plurality of printers in a printing network;
store an allocable page count that is a total number of pages available to a user for printing, corresponding to a difference between an already-allocated page count and a page count upper limit for the user;
receive a page count allocation request from a printer in the printing network; and
determine the page count allocation for the user based on the allocable page count and a relative performance of the printer, from which the page count allocation request has been received, among performances of all printers in the printing network, wherein the page count allocation is equal to or less than the allocable page count,
wherein each of the printers includes a request part operable to make the page count allocation request to the printing management apparatus, in accordance with a print instruction from the user.

14. The printing system of claim 13, wherein
the performance of the printer is at least one of (a) a printing speed of the printer, (b) which of monochrome and color the printer prints in, and (c) whether or not the printer is provided with optional equipment.

15. The printing system of claim 14, wherein
the lower the printing speed of the printer, the lower the allocated page count allocation.

16. The printing system of claim 14, wherein
the printer is any one of N printers used by the user, and
when the printing speed of each of the N printers is Si pages/minute (i=1, . . . , N) and the allocable page count is R pages, the page count allocation of any one of the printers having a printing speed Si is Si×R/(Si+ . . . +SN).

17. The printing system of claim 14, wherein
when the allocable page count is less than a predetermined page count lower limit, the page count allocation is set to a fixed number of pages.

18. The printing system of claim 14, wherein
when the allocable page count is greater than a predetermined upper limit that is greater than a predetermined page count lower limit, the page count allocation is set to a fixed number of pages.

19. The printing system of claim 14, wherein the printing management apparatus further includes:
a receiver operable to receive notification of a remaining page count from the printer, the remaining page count being a page count that is the page count allocation excluding a printed page count; and
wherein the processor is further configured to, when the page count allocation is allocated, reduce the allocable page count by a number of pages equal to the page count allocation, and when the receiver receives the remaining page count, increase the allocable page count by a number of pages equal to the remaining page count.

20. The printing system of claim 13, wherein the page count allocation is determined independent of a number of pages of print data at the printer.

21. The printing system of claim 13, wherein the printer transmits a second page count allocation request to the management apparatus, and receives a second page count allocation.

22. The printing system of claim 13, wherein
the page count allocation is set to a fixed number of pages that is determined in advance when the allocable page count is equal to or greater than a predetermined number of pages, and the page count allocation is set to a number of pages that is equal to or less than the allocable page count and that is in accordance with the performance of the printer when the allocable page count is less than the predetermined number of pages.

23. The printing system of claim 13, wherein the processor stores information for the plurality of printers in the printing network.

24. The printing system of claim 13, wherein the processor is further configured to:
receive a remaining page count corresponding to a difference between a printed page count and the page count allocation; and
update the allocable page count by adding the remaining page count.

25. A printing management method for managing how many pages are printed by a user, comprising:
storing an allocable page count that is a total number of pages available to a user for printing, corresponding to a difference between an already-allocated page count and a page count upper limit for the user;
receiving a page count allocation request from a printer in a printing network having a plurality of printers;
determining a page count allocation based on the allocable page count and a relative performance of the printer, from which the page count allocation request has been received, among performances of all printers in the printing network, wherein the page count allocation is equal to or less than the allocable page count, and
transmitting the page count allocation to the printer.

26. The printing management method of claim 25, wherein the performance of the printer is at least one of (a) a printing speed of the printer, (b) which of monochrome and color the printer prints in, and (c) whether or not the printer is provided with optional equipment.

27. The printing management method of claim 26, wherein the lower the printing speed of the printer, the lower the allocated page count allocation.

28. The printing management method of claim 26, wherein the printer is any one of N printers used by the user, and
when the printing speed of each of the N printers is $S_i$ pages/minute ($i=1, \ldots, N$) and the allocable page count is R pages, the page count allocation of any one of the printers having a printing speed $S_i$ is $S_i \times R/(S_i + \ldots + S_N)$.

29. The printing management method of claim 26, wherein when the allocable page count is less than a predetermined page count lower limit, the page count allocation is set to a fixed number of pages.

30. The printing management method of claim 26, wherein when the allocable page count is greater than a predetermined upper limit that is greater than a predetermined page count lower limit, the page count allocation is set to a fixed number of pages.

31. The printing management method of claim 26, further comprising:
receiving notification of a remaining page count from the printer, the remaining page count being a page count that is the page count allocation excluding a printed page count; and
when the page count allocation is allocated, reducing the allocable page count by a number of pages equal to the page count allocation, and when the remaining page count is received, increasing the allocable page count by a number of pages equal to the remaining page count.

32. The printing management method of claim 25, wherein the page count allocation is determined independent of a number of pages of print data at the printer.

33. The printing management method of claim 25, wherein the printer transmits a second page count allocation request to the management apparatus, and receives a second page count allocation.

34. The printing management method of claim 25, wherein the page count allocation is set to a fixed number of pages that is determined in advance when the allocable page count is equal to or greater than a predetermined number of pages, and the page count allocation is set to a number of pages that is equal to or less than the allocable page count and that is in accordance with the performance of the printer when the allocable page count is less than the predetermined number of pages.

35. The printing management method of claim 25, further comprising storing information for the plurality of printers in the printing network.

36. The printing management method of claim 25, further comprising:
receiving a remaining page count corresponding to a difference between a printed page count and the page count allocation; and
updating the allocable page count by adding the remaining page count.

37. A non-transitory computer-readable recording medium recording therein a computer program configured to be executed by a computer to cause said computer to perform the steps of:
storing an allocable page count that is a total number of pages available to a user for printing, corresponding to a difference between an already-allocated page count and a page count upper limit for the user;
receiving a page count allocation request from a printer in a printing network having a plurality of printers;
determining a page count allocation based on the allocable page count and a relative performance of the printer, from which the page count allocation request has been received, among performances of all printers in the printing network, wherein the page count allocation is equal to or less than the allocable page count, and
transmitting the page count allocation to the printer.

38. The computer-readable recording medium of claim 37, wherein
the performance of the printer is at least one of (a) a printing speed of the printer, (b) which of monochrome and color the printer prints in, and (c) whether or not the printer is provided with optional equipment.

39. The computer-readable recording medium of claim 38, wherein
the lower the printing speed of the printer, the lower the allocated page count allocation.

40. The computer-readable recording medium of claim 38, wherein the printer is any one of N printers used by the user, and
when the printing speed of each of the N printers is $S_i$ pages/minute ($i=1, \ldots, N$) and the allocable page count is R pages, the page count allocation of any one of the printers having a printing speed $S_i$ is $S_i \times R/(S_i + \ldots + S_N)$.

41. The computer-readable recording medium of claim 38, wherein
when the allocable page count is less than a predetermined page count lower limit, the page count allocation is set to a fixed number of pages.

42. The computer-readable recording medium of claim 38, wherein
when the allocable page count is greater than a predetermined upper limit that is greater than a predetermined page count lower limit, the page count allocation is set to a fixed number of pages.

43. The computer-readable recording medium of claim 38, further comprising:

receiving notification of a remaining page count from the printer, the remaining page count being a page count that is the page count allocation excluding a printed page count; and when the page count allocation is allocated, reducing the allocable page count by a number of pages equal to the page count allocation, and when the remaining page count is received, increasing the allocable page count by a number of pages equal to the remaining page count.

44. The computer-readable recording medium of claim 37, further comprising storing information for the plurality of printers in the printing network.

45. The computer-readable recording medium of claim 37, further comprising:
receiving a remaining page count corresponding to a difference between a printed page count and the page count allocation; and
updating the allocable page count by adding the remaining page count.

* * * * *